US006970703B2

(12) United States Patent
Fuchs et al.

(10) Patent No.: US 6,970,703 B2
(45) Date of Patent: Nov. 29, 2005

(54) INTEGRATED PERSONAL COMMUNICATIONS SYSTEM AND METHOD

(75) Inventors: Axel Fuchs, Park Ridge, IL (US); David J. Wheatley, North Barrington (GB); William S. Hede, Lake in the Hills, IL (US); James A. Van Bosch, Crystal Lake, IL (US); Robert F. D'Avello, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 382 days.

(21) Appl. No.: 10/055,518

(22) Filed: Jan. 23, 2002

(65) Prior Publication Data

US 2003/0139179 A1  Jul. 24, 2003

(51) Int. Cl.[7] ............................................... H04Q 7/20
(52) U.S. Cl. ................... 455/426.1; 455/432.1; 455/435.1; 455/66.1; 455/569.2; 340/907; 340/901; 701/51; 701/45; 701/213
(58) Field of Search .................... 455/426.1, 432.1, 455/435.1, 66.1, 569.2; 340/907, 901; 701/51, 701/45, 213

(56) References Cited

U.S. PATENT DOCUMENTS

| | | | |
|---|---|---|---|
| 4,989,230 A | 1/1991 | Gillig et al. | |
| 5,081,667 A | 1/1992 | Drori et al. | |
| 5,307,048 A | 4/1994 | Sonders | |
| 5,732,074 A | 3/1998 | Spaur et al. | |
| 6,052,595 A | 4/2000 | Schellinger et al. | |
| 6,122,514 A | 9/2000 | Spaur et al. | |
| 6,161,005 A | 12/2000 | Pinzon | |
| 6,243,581 B1 | 6/2001 | Jawanda | |
| 6,262,656 B1 | 7/2001 | Byrd et al. | |
| 6,400,946 B1 * | 6/2002 | Vazvan et al. | ............ 455/432.1 |
| 6,522,884 B2 * | 2/2003 | Tennison et al. | ............ 455/445 |
| 2002/0140545 A1 * | 10/2002 | Nietupski et al. | ............ 340/5.72 |
| 2002/0165789 A1 * | 11/2002 | Dudek et al. | .................. 705/26 |
| 2003/0120395 A1 * | 6/2003 | Kacel | .............................. 701/1 |
| 2003/0120826 A1 * | 6/2003 | Shay | ........................... 709/316 |
| 2003/0134614 A1 * | 7/2003 | Dye | ............................ 455/406 |
| 2003/0134636 A1 * | 7/2003 | Sundar et al. | ............... 455/432 |
| 2003/0225668 A1 * | 12/2003 | Goto et al. | .................... 705/37 |

FOREIGN PATENT DOCUMENTS

| | | |
|---|---|---|
| EP | 1 093 102 A1 | 4/2001 |
| WO | WO 95/22131 A1 | 8/1995 |
| WO | WO 01/58190 A1 | 8/2001 |
| WO | WO 01/76170 A2 | 10/2001 |

\* cited by examiner

*Primary Examiner*—Sonny Trinh
*Assistant Examiner*—Huy Phan
(74) *Attorney, Agent, or Firm*—Kevin D. Wills; Thomas V. Miller (57) ABSTRACT

An apparatus and method of integrating a personal communications system (102) includes a telematics device (106) coupled to a vehicle (107), where the telematics device (106) can exchange data with at least one vehicle system (139, 140) and where telematics device (106) includes a service providing entity (126). A remote device (104) having a service requesting entity (156) can access and exchange data with the telematics device (106) utilizing the service requesting entity (156) to interact with at least one vehicle system (139, 140) and utilize and exchange data with service providing entity (126). A selection is made between a first wireless network protocol (110) and a second wireless network protocol (112) in order to access telematics device (106).

16 Claims, 8 Drawing Sheets

INTEGRATED PERSONAL COMMUNICATIONS SYSTEM AND METHOD

BACKGROUND OF THE INVENTION

There is an ever-increasing demand for wireless communication and convenience. Wireless subscribers desire to have access to information at any time and in any place. Wireless subscribers also desire to be able to control other mechanical and electronic devices through one wireless device in an efficient and cost-effective manner. One of the fastest growing markets for providing wireless services is known as "telematics" and entails delivering a wide spectrum of information via wireless links to vehicle-based subscribers. The information can originate from multiple sources, such as the Internet and other public, private, and/or government computer-based networks; wireless telecommunications such as cellular, Personal Communication Service (PCS), satellite, land-mobile, and the like; terrestrial and satellite direct broadcasts including traditional AM/FM bands, broadband, television, video, geolocation and navigation via a global position system (GPS), and the like; concierge services providing roadside assistance, emergency calling, remote-door unlocking, automatic collision notification, travel conditions, vehicle security, stolen vehicle recovery, remote vehicle diagnostics, and the like; advertising services identifying names and locations of businesses such as gas stations, restaurants, hotels, stores, and offices, and the like; tourist services such as points of interest, directions, hours of access, and the like; short range devices such as personal digital assistants (PDA's), and many other sources that can provide information of any type.

Information can be communicated to telematics devices over relatively long wireless links, such as from a satellite or terrestrial node, or from relatively short wireless or wired links, such as from in-vehicle equipment or from hand-held devices like PDAs, portable computers, cellular phones, and the like.

In prior art systems, subscribers often have two separate wireless devices and two separate wireless accounts and/or two different phone numbers/access codes, one for telematics and one for their personal wireless devices. The wireless devices that link to the telematics system are generally short-range and provide limited functionality. The personal wireless devices are often incompatible with the telematics device and limit access to the telematics device and vehicle systems. The subscriber must carry around at least two different wireless devices that are incompatible or fail to interoperate effectively. Another drawback of the prior art is that a subscriber's personal wireless device does not interoperate with a vehicle's security features such as door-locking, alarm system, car-jacking prevention, automatic collision notification system, and the like. Today's wireless subscriber desires that the vast array of features available to both a telematics device and a personal wireless service be integrated into one wireless device.

Accordingly, there is a significant need for a method for an integrated personal communications system that overcomes the deficiencies of the prior art outlined above.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact. However, "coupled" may also mean that two or more elements are not in direct contact with each other, but yet still co-operate or interact with each other.

For clarity of explanation, the illustrate embodiments of the present invention is presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Figure 1:
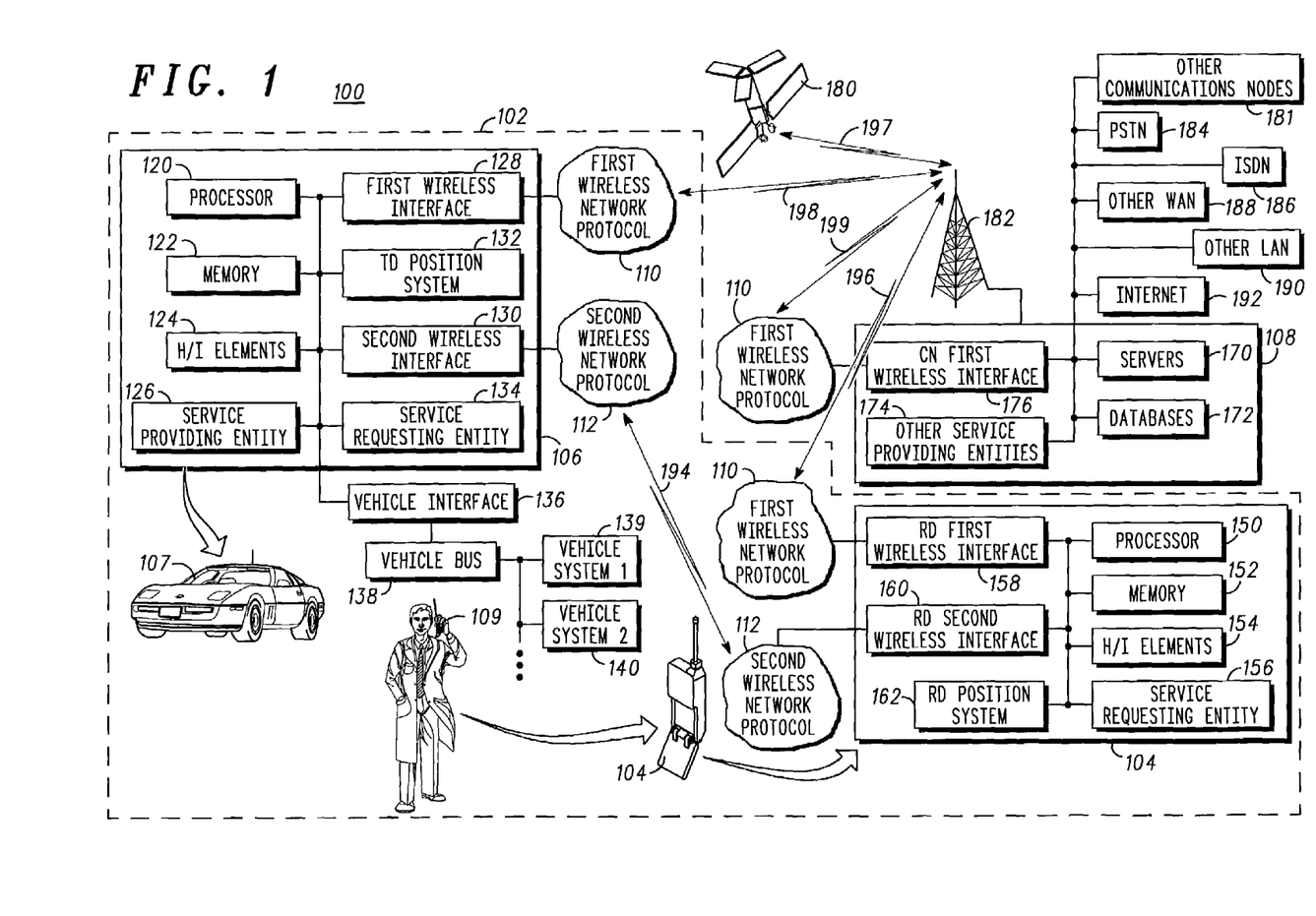
FIG. 1 depicts a distributed communications system according to one embodiment of the invention.

FIG. 1 depicts an exemplary distributed communications system 100, according to one embodiment of the invention. As shown in FIG. 1, distributed communications system 100 includes telematics device 106 coupled to vehicle 107, remote device 104 and communications node 108. Personal communications system 102 comprises remote device 104 and telematics device 106 coupled to vehicle 107. Although only one remote device 104, telematics device 106 and vehicle are shown as comprising personal communications system 102, the invention can include any number of these elements interoperating with each other.

Telematics device 106 is coupled to and integrated with vehicle 107, such as a car, truck, bus, train, aircraft, boat, and the like. Telematics device 106 includes, among other things, an integrated in-vehicle wireline and wireless communications system that operates to communicate content to and from vehicle through wireless means. In the embodiment depicted in FIG. 1, telematics device 106 includes a processor 120 for processing algorithms stored in memory 122. Memory 122 comprises control algorithms, and can include, but is not limited to, random access memory (RAM), read only memory (ROM), flash memory, electrically erasable programmable ROM (EEPROM), and the like. Memory 122 can contain stored instructions, tables, data, and the like, to be utilized by processor 120. Memory 122 can also can be used to store information pertaining to integrated personal communications system 102, for example, personal profiles, usage history, preferences, and the like.

Telematics device can optionally include human interface (H/I) elements 124, which can comprise elements such as a display, a multi-position controller, one or more control knobs, one or more indicators such as bulbs or light emitting diodes (LEDs), one or more control buttons, one or more speakers, a microphone, and any other H/I elements required by wireless device. H/I elements 124 can request and display content and data including, application data, position data, personal data, email, audio/video, and the like. The invention is not limited by the (H/I) elements described above. As those skilled in the art will appreciate, the (H/I) elements outlined above are meant to be representative and to not reflect all possible (H/I) elements that may be employed.

Services can be offered to users of integrated personal communications system 102 via telematics device 106. Services can be located at telematics device 106, communications node 108, distributed between telematics device 106, communications node 108, and other communications systems, and the like. Service providing entity 126 provides access to services by acting as a gateway to services. Service requesting entity 134, 156 communicates with service providing entity 126 to provide access to services. As shown in FIG. 1, service requesting entity 134, 156 can be distributed between telematics device 106 and remote device 104. In another embodiment, service requesting entity 156 can be located solely at remote device. A service can be an encapsulation of some functionality that is of use to one or more service requesting entities 134, 156 (current or anticipated) or that needs to be isolated from the service requesting entity for some reason. Services also provide a desired functionality of a human user, such as applications, an on-board global positioning system (GPS) device, games, email, and the like. A service providing entity 126 can provide access to information or perform some computation.

Telematics device 106 also includes one or more telematics device (TD) position system 132. TD position system 132 is located within telematics device 106 or vehicle 107. TD position system 132 can include any number of position sources, devices and software elements designed to determine a position of telematics device 106 and associated vehicle 107. Examples of sources and devices, without limitation, include global positioning system (GPS), differential GPS, a kiosk (fixed position source), and enhanced observed time difference (EOTD), which comprise terrestrial cellular triangulation, and the like. Other navigational position sources and software can include, without limitation, an airspeed device, Doppler device, inclinometer, accelerometer, speedometer, compass, gyroscope altimeter, network-assisted GPS, differential GPS, any combination of optical transmitters, receivers, reflectors, optically readable tag, gyro, and the like.

Telematics device 106 includes first wireless interface 128 and second wireless interface 130. First wireless interface 128 comprises one or more network access devices (NAD's) that can utilize first wireless network protocol 110 that can, for example and without limitation, be a wide area network (WAN) protocol. For example, first wireless network protocol 110 can be narrowband and/or broadband connections with standard cellular network protocols such as Global System for Mobile Communications (GSM), Time Division Multiple Access (TDMA), Code Division Multiple Access (CDMA), and the like. In another embodiment, standard transmission control protocol/internet protocol (TCP/IP) can also be used. First wireless interface 128 and first wireless network protocol 110 can also send and receive content using standard paging networks, FM sub-carriers, satellite networks, and the like.

Second wireless interface comprises one or more NAD's that can use second wireless network protocol 112 that can be a local area network protocol (LAN). Second wireless network protocol 112 can be used in a peer-to-peer environment or in a piconet environment. Second wireless network protocol 112 can also be used with a second wireless network gateway 316 as shown below in FIG. 3 in a peer-to-peer or piconet environment. Second wireless network protocol 112 can include "over the air" transport protocols, telephony control protocols, adopted protocols, core protocols, cable replacement protocols, and the like. In the embodiment shown in FIG. 1, second wireless network protocol 112 is a wireless local area network (WLAN) protocol. There are numerous WLAN systems, each with their own software protocols and protocol stacks to enable remote device 104 and telematics device 106 to communicate and exchange content, including, voice, data, content, and the like. Examples of these WLAN systems include, but are not limited to, Bluetooth, Infrared Data Association (IrDA), Object Exchange Protocol (OBEX), HomeRF, 802.11, Wireless Area Protocol (WAP), Dedicated Short Range Communication (DSRC) system, and the like.

Telematics device 106 is coupled to vehicle electrical bus 138 via vehicle interface 136, which can be, without limitation, a wireless or wireline interface. Vehicle bus 138 and vehicle interface 136 allow telematics device 106 to communicate with and exchange data with at least one vehicle system 139, 140. Exchanging data with at least one vehicle system 139, 140 can include, without limitation, accessing, operating, configuring, controlling, streaming media to and from, voice communication, downloading or uploading software, communicating status of at least one vehicle system 139, 140, and the like. Although two vehicle systems, vehicle system 1 139 and vehicle system 2 140 are shown in FIG. 1, the invention includes any number of vehicle systems. At least one vehicle system 139, 140 can include, for example and without limitation, ignition system, door-locking system, comfort features such as seat and mirror adjustments, climate control, automatic distress system, security system, positioning system(s), and the like. Vehicle bus 138 also allows telematics device 106 to access the status of any of vehicle systems, for example, security status, engine status, internal climate status, occupancy detection system, car start detection system, change in vehicle position (delta-GPS) system, and the like. In one embodiment, vehicle bus 138 and vehicle interface 136 allow telematics device to exchange data with including access, operate, control and configure any of the at least one vehicle systems 139, 140.

Remote device 104 can be carried by a user 109 and without limitation can include a wireless unit such as a cellular or Personal Communication System (PCS) telephone, a pager, a hand-held computing device such as a personal digital assistant (PDA) or Web appliance, a personal computer, or any other type of wireless or wireline communications and/or computing device. In the embodiment depicted in FIG. 1, remote device 104 includes a processor 150 for processing algorithms stored in memory 152. Memory 152 comprises control algorithms, and can include, but is not limited to, random access memory (RAM), read only memory (ROM), flash memory, electrically erasable programmable ROM (EEPROM), and the like. Memory 152 can contain stored instructions, tables, data, and the like, to be utilized by processor 150. Memory 152 can also can be used to store information pertaining to integrated personal communications system 102, for example, user profiles, usage history, preferences, and the like.

Remote device 104 can include human interface (H/I) elements 154, which can comprise elements such as a display, a multi-position controller, one or more control knobs, one or more indicators such as bulbs or light emitting diodes (LEDs), one or more control buttons, one or more speakers, a microphone, and any other H/I elements required by wireless device. H/I elements 154 can request and display content and data including, application data, position data, personal data, email, audio/video, and the like. The invention is not limited by the (H/I) elements described above. As those skilled in the art will appreciate, the (H/I) elements outlined above are meant to be representative and to not reflect all possible (H/I) elements that may be employed.

Remote device 104 also includes any number of service requesting entities 156, which provide access to services via service providing entity 126 as described above. Service requesting entity 156 can be, for example and without limitation, an application, and the like. Examples of a service requesting entity 134, 156 include, email applications, word processor applications, position location applications, specialized applications to exchange data with including access, control and configure at least one vehicle system 139, 140 and telematics device 106, and the like.

Remote device 104 includes remote device (RD) position system 162 that can include elements analogous to those for TD position system 132 described above. Remote device 104 also includes RD first wireless interface 158, which is analogous to first wireless interface 128 in telematics device 106 and can utilize first wireless network protocol 110. Remote device 104 also includes RD second wireless interface 160, which is analogous to second wireless interface 130 in telematics device 106 and can utilize second wireless network protocol 112.

Distributed communications system 100 can also include a communications node 108, which can be coupled to any number of local nodes 182 to provide wireless communication to and from remote device 104 via wireless communication link 196, and telematics device 106 via wireless communication links 198, 199. Communications node 108 also can communicate with satellite 180 via wireless communication link 197. Communications node 108 is shown communicating with satellite 180 via local node 182, however, communications node 108 is also capable of communicating directly with satellite 180.

Communications node 108 can include servers 170 and other service providing entities 174 similar to those described above. Communications node 108 can also include one or more databases 172 which can include a hard drive, floppy disk drive, optical drive, CD-ROM, RAM, ROM, EEPROM, or any other means of storing content, which can be utilized by remote device 104 and telematics device 106. In the embodiment depicted in FIG. 1, databases 172 function to store location information, user profiles, traffic content, map content, point-of-interest content, usage history, and the like. However databases 172 are not limited to these functions, and other database functions are within the scope of the invention.

Communications node 108 can also include a communications node (CN) first wireless interface 176, which is analogous to first wireless interface 128 in telematics device 106 and can utilize first wireless network protocol 110. Communications node 108 can be coupled to a public switched telecommunication network (PSTN) 184, Internet 192, an integrated services digital network (ISDN) 186, other local area network (LAN) 190, other wide area network (WAN) 188, and any number of other communications nodes 181.

The elements shown in remote device 104, telematics device 106 and communications node 108 are exemplary and not limiting of the invention. Other hardware and software blocks can also be included in telematics device 106, remote device 104 and communications node 108 and are also within the scope of the invention.

Software blocks that perform embodiments of the invention are part of computer program modules comprising computer instructions, such as control algorithms, that are stored in a computer-readable medium such as memory described above. Computer instructions can instruct processors to perform methods of integrating a personal communications system 102. In other embodiments, additional modules could be provided as needed.

In the integrated personal communications system 102 depicted in FIG. 1, remote device 104 can access telematics device 106 utilizing service requesting entity 156 to exchange data with telematics device 106, at least one vehicle system 139, 140 and utilize service providing entity 126. Remote device 104 can access telematics device 106 by selecting either the first wireless network protocol 110 or the second wireless network protocol 112. If the first wireless network protocol 110 is selected, remote device 104 communicates with telematics device 106 via communications node 108 and wireless communication links 196 and 198. If second wireless network protocol 112 is selected, remote device communicates with telematics device 106 over a WLAN through wireless communication link 194.

Through access to telematics device 106, remote device 104 can exchange data with including access, control, configure, operate and check the status of telematics device, at least one vehicle system 139, 140, and service providing entity 126. In another embodiment, remote device 104 can be used to exchange data with including access, control, configure, operate, check the status of, and the like of telematics device 106 and at least one vehicle system 139, 140 in at least one vehicle 107. In other words, remote device 104 can exchange data with including access, control, configure, operate, and the like, the telematics device 106, vehicle systems, and service providing entities 126 in more than one vehicle 107. In an example of an embodiment, remote device 104 can transfer software to telematics device 106, receive the status of any of at least one vehicle system 139, 140, upload and download software, stream media, exchange software with, communicate content to telematics device 106 and control telematics device 106. Remote device 104 can perform analogous functions to at least one vehicle system 139, 140 and service providing entity 126.

User 109 can create a user profile using remote device 104 or any other electronic device that can access distributed communications system 100, for example, a personal computer and a web browser, and the like. User profile can be used to personalize or preset telematics device 106, at least one vehicle system 139, 140, or service providing entity 126 via the telematics device 106. In one embodiment, in order to gain access to telematics device 106 and the associated vehicle 107, vehicle systems 139, 140, and service providing entity 126, remote device 104 must be registered with telematics device 106. This can be accomplished, for example and without limitation by a device original equipment manufacturer (OEM), like the manufacturer of remote device 104, telematics device 106, and the like. In another embodiment remote device 104 can be registered by a third party, for example, a dealership that sells vehicle 107, telematics device 106 or remote device 104, and the like. In yet another embodiment, a user 109 of remote device 104 can register one or more remote devices 104. In addition to remote device 104, a further embodiment requires user 109 to register with the telematics device 106 as well. User 109 can register via telematics device 106, remote device 104, a personal computer, other electronic device, and the like. The user profile can contain registration information for the remote device 104, telematics device 106, or both. The user profile can be stored in the remote device 104 and "pushed" to the telematics device when user 109 attempts access telematics device 106. In another embodiment, the user profile can be stored at the telematics device 106 subsequent to registration and the remote device 104 can "pull" and synchronize the necessary authentication information via the remote device 104. In another embodiment, remote device can be used instead of keys or other conventional access methods currently used to access vehicle 107. In this embodiment, user 109 and remote device 104 need to be registered and remote device 104 needs to be used to access vehicle 107, telematics device 106, vehicle systems 139, 140, service providing entity 126, and the like.

In still another embodiment, user profile can be input directly into telematics device and control which remote devices 104 can access, exchange data with, control, operate, and the like, telematics device 106, at least one vehicle systems 139, 140, service providing entity 126, and the like. In an embodiment, user profile that is registered to telematics device 106 can control which of first wireless network protocol 110 and second wireless network protocol 112 are permitted to access telematics device 106 including at least one vehicle systems 139, 140, service providing entity 126, and the like. User profile registered with telematics device 106 can also control which remote devices 104 are permitted to access telematics device 106, at least one vehicle system 139, 140, service providing entity 126, and the like. As an example of an embodiment, several remote devices 104 can be registered to telematics device 106, but only one remote device 104 is the primary remote device 104, while the others are secondary remote devices. A user profile registered to telematics device 106 can restrict access to telematics device 106, at least one vehicle system 139, 140, service providing entity 126, and the like, to only primary remote device and any secondary remote devices designated by user profile.

As still another example of an embodiment, user profile can designate that telematics device 106 can only be accessed, or that certain of at least one vehicle systems 139, 140, service providing entity 126, and the like can be accessed via first wireless networking protocol 110 or second wireless networking protocol 112, or both. For example, user profile can designate that a door unlocking function or car start function can only be performed via second wireless networking protocol 112 and/or by only the primary remote device and designated secondary remote devices.

The embodiments utilizing a user profile are exemplary and are not meant to be limiting of the invention. Other variations and uses of user profile will occur to one skilled in the art and are within the scope of the invention.

Figure 2:
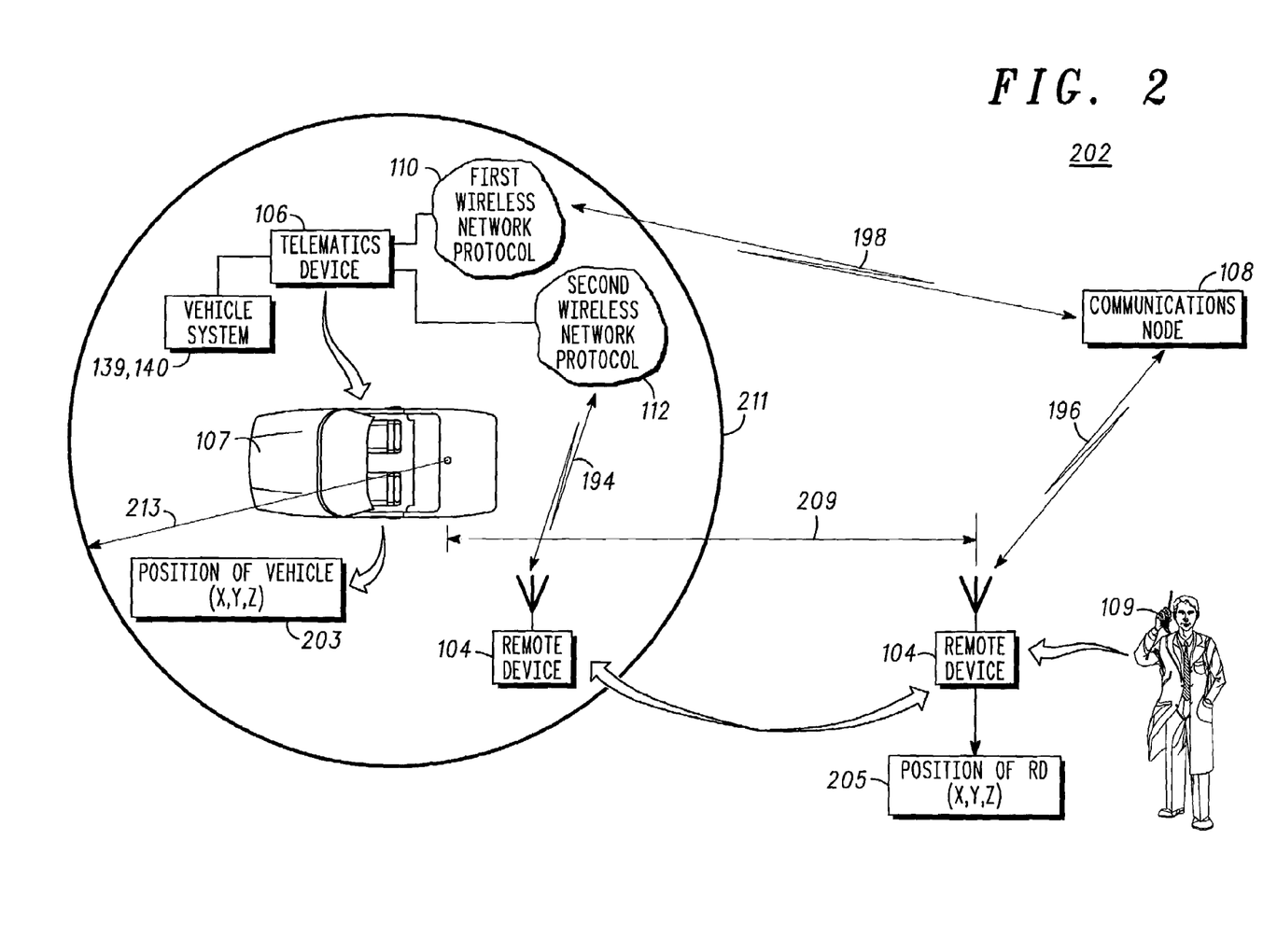
FIG. 2 depicts an integrated personal communications system according to one embodiment of the invention.

FIG. 2 depicts an integrated personal communications system 102 according to one embodiment of the invention. In one embodiment, either the position of vehicle 107 is requested by remote device 104 or the position of vehicle 107 is automatically communicated to remote device 104. In this embodiment, using TD position system 132 computes a position of vehicle 203. If remote device 104 is within range 211 of second wireless interface 130 and associated second wireless network protocol 112, then position of vehicle 203 is communicated to remote device 104 via wireless communication link 194. If remote device 104 is out of range 211, then position of vehicle 203 is communicated to remote device 104 using first wireless network protocol 110 via communications node 108 and wireless links 198 and 196.

In another embodiment, either the relative position of vehicle 209 to remote device 104 is requested by remote device 104 or the relative position of vehicle 209 to remote device 104 is automatically communicated to remote device 104. As above, TD position system 132 computes a position of vehicle 203. Also, RD position system 162 computes a position of remote device 205. Position of vehicle 203 and position of remote device 205 are utilized to compute relative position of vehicle 209 to remote device 104. If remote device 104 is within range 211 of second wireless interface 130 and associated second wireless network protocol 112, then relative position of vehicle 209 is communicated to remote device 104 via wireless communication link 194. If remote device 104 is out of range 211, then relative position of vehicle 209 is communicated to remote device 104 using first wireless network protocol 110 via communications node 108 and wireless links 198 and 196. In the embodiment of FIG. 2, position of vehicle 203 and position of remote device 205 can be measured in any convenient two or three dimensional coordinate system, for example, Cartesian coordinates, polar coordinates, distance, bearing and elevation, and the like.

Figure 3:
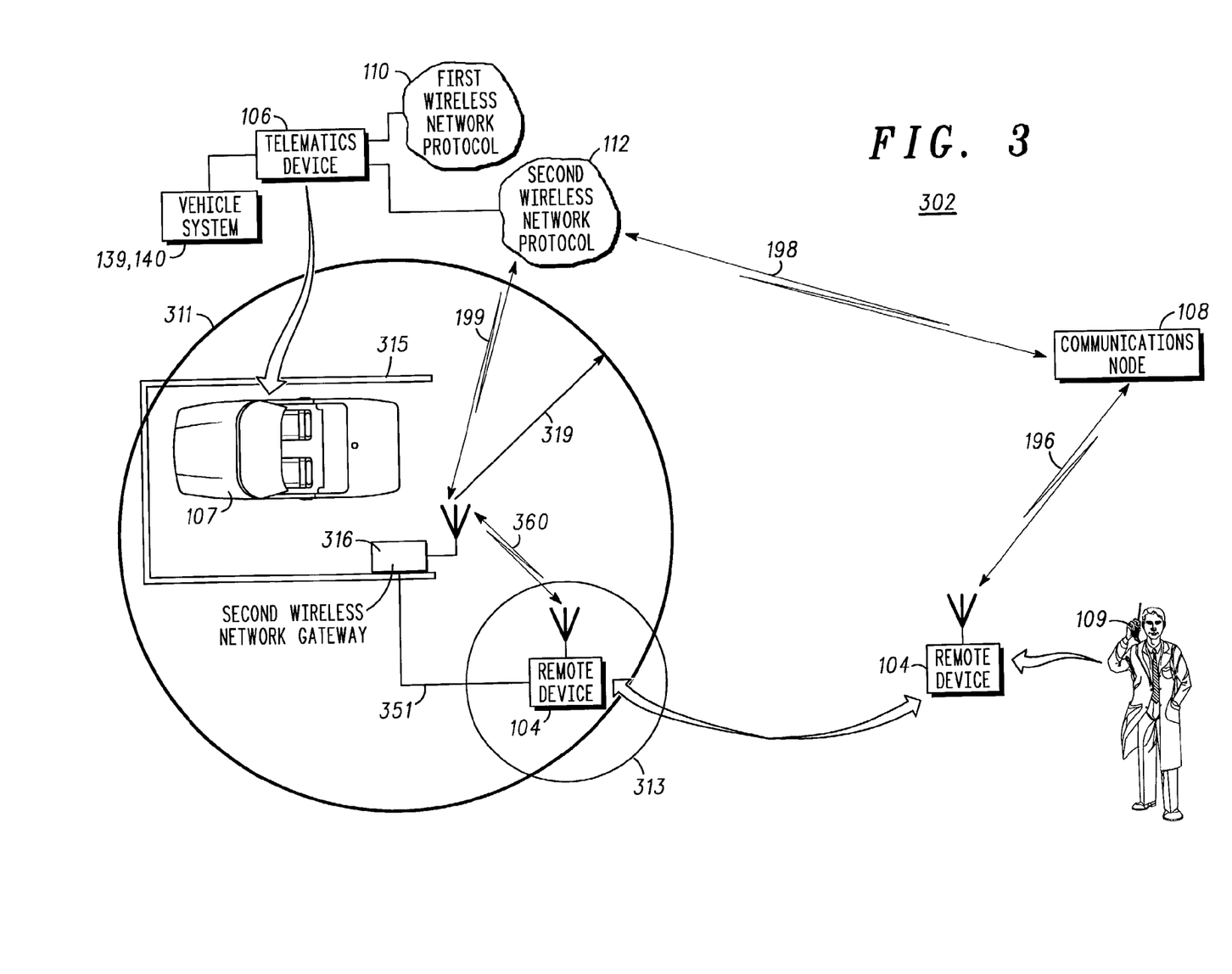
FIG. 3 depicts an integrated personal communications system according to another embodiment of the invention.

FIG. 3 depicts an integrated personal communications system 102 according to another embodiment of the invention. As depicted in FIG. 3, telematics device 106 and vehicle are located in a parking area 305 or other location such that telematics device 106 is within range 311 of second wireless network gateway 316 as defined by radius 319. Second wireless network gateway 316, can, for example, be a hub for a WLAN. Second wireless network gateway 316 can be fixed or mobile and operates using second wireless network protocol 112. Remote device 104 can communicate with second wireless network gateway 316 over wireless communication link 360 or wireline link 351.

In FIG. 3, remote device 104 is depicted both in range of 311 and out of range 311 of second wireless network gateway 316. If remote device 104 is within range 311 of second wireless network gateway 316, remote device can communicate with second wireless network gateway 316 using either wireless communication link 360 or wireline link 351. If remote device 104 is out of range 311, remote device 104 can communicate with second wireless network gateway 316 using wireline link 351. In one embodiment, remote device 104 can be within range 311 of second wireless network gateway 316 but still have telematics device 106 out of range 313 of RD second wireless interface 160. In this embodiment depicted in FIG. 3, remote device 104 can still communicate with telematics device 106 in a peer-to-peer environment using second wireless network protocol 112 by both telematics device 106 and remote device 104 being within range 311 of second wireless network gateway 316. So, even though telematics device 106 and remote device 104 cannot communicate directly using second wireless network protocol 112, they can still do so while they are both within the range 311 of second wireless network gateway, where second wireless network gateway 316 acts as a repeater to so that telematics device 106 and remote device 104 can communicate using second wireless network protocol 112. In this embodiment, a WLAN is effectively set up through the use of second wireless network gateway 316.

In another embodiment, remote device 104 is out of range 311 of second wireless network gateway 316. In this embodiment, remote device 104 communicates with telematics device 106 using first wireless network protocol 110 as described in FIG. 2 or via second wireless network gateway 316. As an example, remote device 104 can be a personal computer and access second wireless network gateway 316 via the internet 192 and a web browser. Since telematics device 106 is within range of second wireless network gateway 316, a user can access telematics device via remote device, wireline communication link 351 and second wireless network gateway 316 using second wireless network protocol 112. This has the advantage of a less expensive form of access to telematics device 106 since telematics device 106 is accessed using only second wireless network protocol 112 and not the often more expensive first wireless network protocol 110.

In still another embodiment, one or more telematics devices 106 can be within range of second wireless network gateway 316, for example in two different vehicles 107, and one or more remote devices 104 can also be within range of second wireless network gateway 316. In this embodiment, the telematics devices 106 form a piconet and can access second wireless network gateway 316, and remote devices 104 form their own piconet and can access second wireless network gateway 316. Using second wireless network gateway 316 each of the piconets can communicate with each other using second wireless network protocol 112. In still yet another embodiment, one device can communicate with a piconet of other devices utilizing second wireless network gateway 316. In yet another embodiment, position of vehicle 203 or relative position of vehicle 209 can be established via second wireless network gateway 316.

The remote device 104, telematics device 106 and the configuration thereof depicted in FIG. 3 is exemplary and not meant to be limiting of the invention. Other electronic devices can be included in WLAN and other configurations are possible and within the scope of the invention.

Figure 4A:
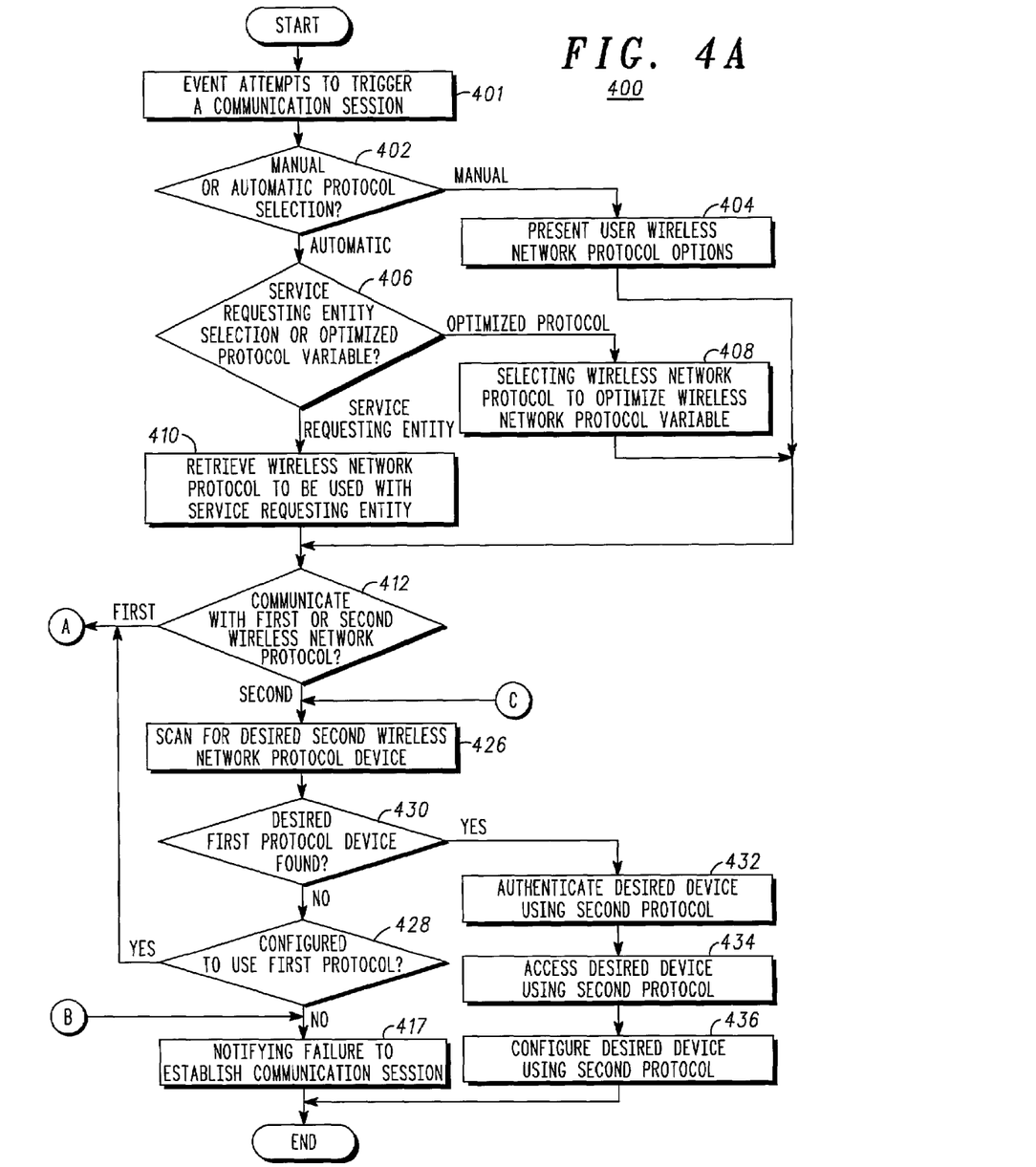
FIGS. 4A and 4B illustrate a flow diagram of a method of the invention according an embodiment of the invention.
Figure 4B:
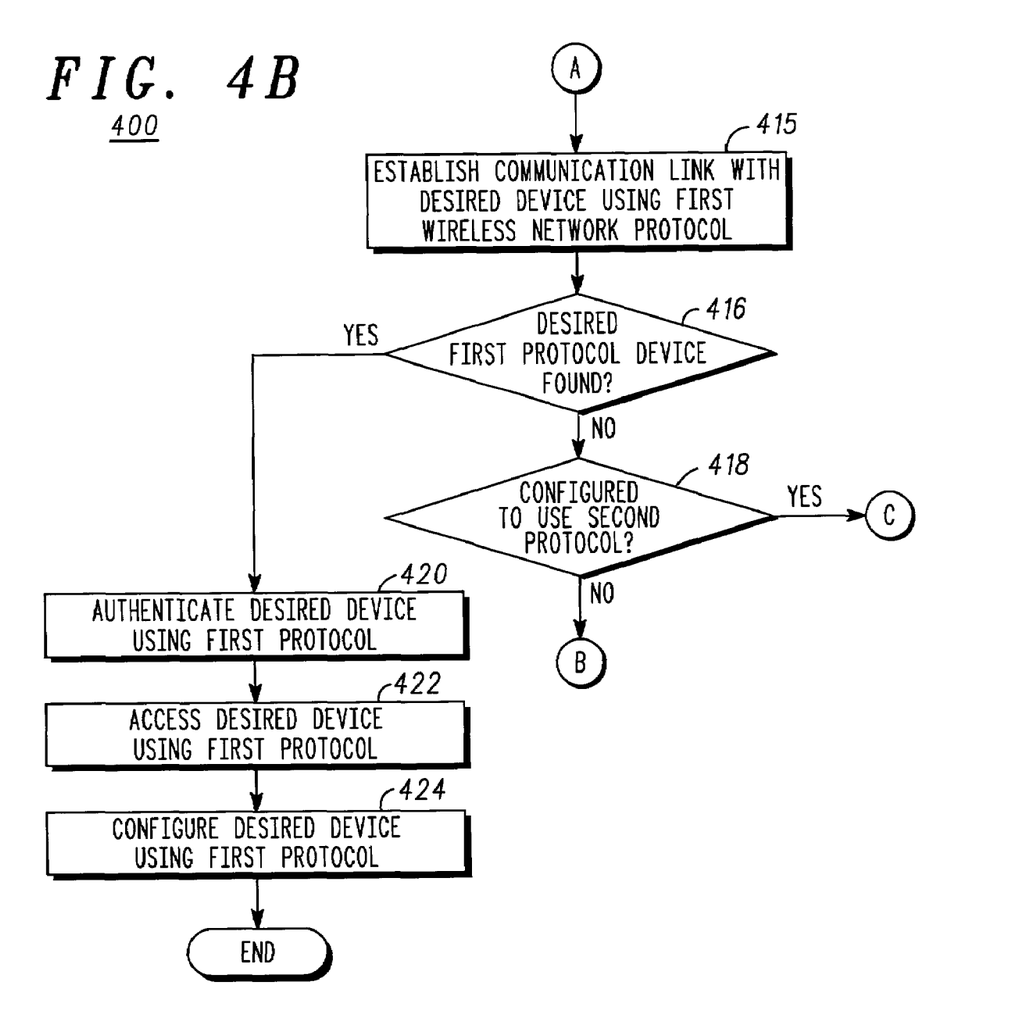

FIGS. 4A and 4B illustrate a flow diagram 400 of a method of the invention according an embodiment of the invention. In step 401 an event attempts to trigger a communication session. An event can, for example and without limitation, be a manual or automatic action by either remote device 104 or telematics device 106 that requires contacting another electronic device. For example, an event can be one or more vehicle systems 139, 150 attempting to contact remote device 104 via telematics device 106. In another example, an event can be remote device attempting to contact telematics device 106 to exchange data such as inquire on the status of one or more vehicle system 139, 140 or configure one or more vehicle systems 139, 140. A communication session can be a period of communication between two devices. In the present embodiment, either remote device 104 or telematics device 106 can initiate an event that attempts to trigger a communication session.

In step 402 it is decided if the event requires a manual or automatic protocol selection. In the present embodiment, the selection is between first wireless network protocol 110 and second wireless network protocol 112. If manual selection is set for the event, the user 109 is presented with the wireless network protocol options per step 404. In the present embodiment, the user 109 can select between first wireless network protocol 110 and second wireless network protocol 112.

If automatic protocol selection is determined in step 402, then it is determined, per step 406, whether service requesting entity 134, 156 selects the protocol or the protocol is selected based on optimizing a protocol variable. If it is determined that the protocol is selected by optimizing wireless network protocol variable, then the protocol is selected by optimizing one or more protocol variables per step 408. Protocol variables can include, without limitation, cost, quality, availability, and the like of the protocol selected. If it is determined in step 406 that service requesting entity 134, 156 selects the protocol per step 406, then the wireless network protocol to be used with the service requesting entity 134, 156 is retrieved per step 410.

Once it is determined which entity is selecting the wireless networking protocol above, it is determined whether first wireless network protocol 110 or second wireless network protocol 112 is to be used in the communication session per step 412. If first wireless network protocol 110 is selected, an attempt is made to establish a wireless communication link with the desired device using first wireless network protocol 110 per step 414. In an embodiment, desired device is telematics device 106 if remote device 104, as requesting device, is attempting to trigger a communication session and desired device is remote device 104 if telematics device 106, as requesting device, is attempting to trigger a communication session.

In step 416 it is determined if desired device is found using first wireless network protocol 110. If not, then it is determined if the requesting device or service requesting entity 134, 156 is configured to use second wireless network protocol 112 per step 418. If so, then desired device is sought by scanning using second wireless network protocol 112 per step 426. If not, then the requesting device is notified of the failure to establish a communication session per step 417. If desired device is found using first wireless network protocol 110 per step 416, then the desired device authenticates the requesting device to ensure that requesting device is authorized to have access to desired device using first wireless network protocol 110 per step 420. Assuming desired device and requesting device are authorized to communicate, access is given to desired device using first wireless network protocol 110 per step 422. Once access is achieved, desired device and requesting device can exchange data, and desired or requesting device can be configured, programmed, operated, and the like using first wireless network protocol 110 per step 424.

If second wireless network protocol 112 is selected per step 412, requesting device scans for desired device using second wireless network protocol 112 per step 426. In step 430 it is determined if desired device is found using second wireless network protocol 112. If not, then it is determined if the requesting device or service requesting entity 134, 156 is configured to use first wireless network protocol 110 per step 428. If so, then desired device is sought using first wireless network protocol 110 per step 414. If not, then the requesting device is notified of the failure to establish a communication session per step 417. If desired device is found using second wireless network protocol 112 per step 430, then the desired device authenticates the requesting device to ensure that requesting device is authorized to have access to desired device using second wireless network protocol 112 per step 432. Assuming desired device and requesting device are authorized to communicate, access is given to desired device using second wireless network protocol 112 per step 434. Communication using second wireless network protocol 112 includes communication through one or more second wireless network gateways 316 as shown and described in FIG. 3. Once access is achieved, desired device and requesting device can exchange data, and desired or requesting device can be configured, programmed, operated, and the like using second wireless network protocol 112 per step 436.

Figure 5:
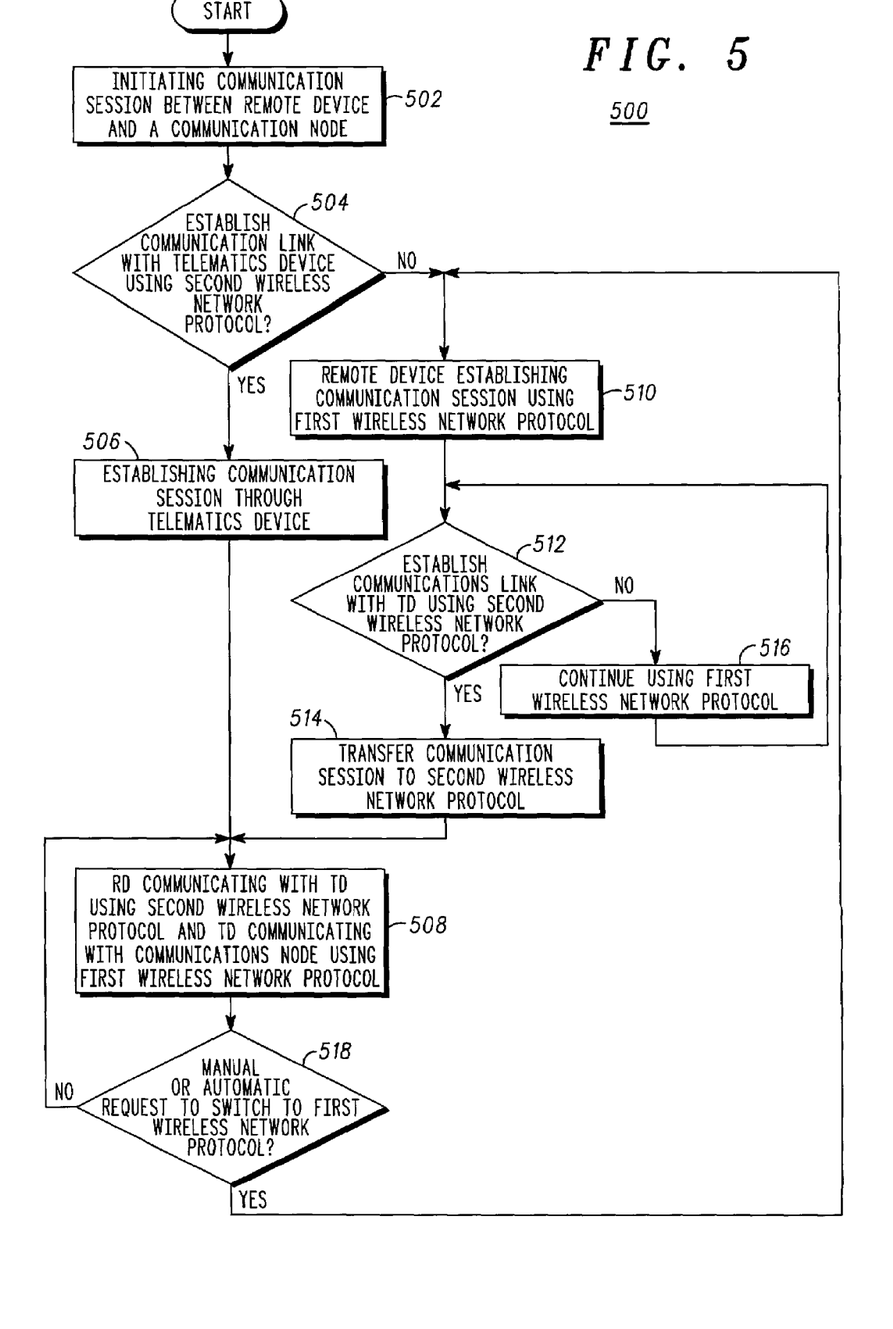
FIG. 5 illustrates a flow diagram of a method of the invention according another embodiment of the invention.

FIG. 5 illustrates a flow diagram 500 of a method of the invention according another embodiment of the invention. The flow diagram 500 represents an exemplary embodiment of how a remote device 104 can alternate between wirelessly communicating with a communications node 108 utilizing a first wireless network protocol 110 and wirelessly communicating with communications node 108 through telematics device 106 using second wireless network protocol 112 and first wireless network protocol 110.

In step 502, a communication session is initiated between remote device 104 and communications node 108. In one embodiment, remote device 104 can initiate the communications session, and in another embodiment, remote device 104 can act as desired device, in effect, receiving a request for a communications session. In step 504 it is determined if remote device 104 can establish a wireless communication link with telematics device 106 using second wireless network protocol 112. If so, communication session is established using second wireless network protocol 112 to telematics device 106 per step 506. In an embodiment, communication using second wireless network protocol 112 can be via one or more second wireless network gateways 316 as shown and described in FIG. 3.

In step 508, subsequent to establishment of communications session using second wireless network protocol 112 between remote device 104 and telematics device 106, remote device (RD) 104 is communicating with telematics device (TD) 106 using second wireless network protocol 112 and telematics device 106 is communicating with communications node 108 using first wireless network protocol 110. In effect, remote device 104 is communicating with communications node 108 through telematics device 106 using second wireless network protocol 112 to establish a wireless communication link with telematics device 106 and telematics device 106 is establishing a wireless communication link with communications node 108 using first wireless network protocol 110.

If remote device 104 is unable to establish a wireless communication link with telematics device 106 using second wireless network protocol 112 in step 504 either in a peer-to-peer environment, piconet environment, through one or more second wireless network gateways 316, or any combination thereof, and the like, remote device 104 then establishes communication session with communications node 108 using first wireless network protocol 110 per step 510. During the communications session established in step 510, remote device 104 will determine if it can establish a wireless communications link with telematics device 106 using second wireless network protocol 112 per step 512. If not, remote device 104 continues using first wireless network protocol 110 during communications session per step 516 while continuing to seek telematics device as indicated by the return arrow from step 516. If remote device is able to establish wireless communication link with telematics device per step 512, then communications session is transferred to second wireless network protocol per step 514 and communications session continues as described in step 508 above with remote device 104 communicating with communications node 108 through telematics device 106.

In step 518 it is determined if there is a manual or automatic request to switch from second wireless network protocol 112 to first wireless network protocol, and to no longer channel communication session through telematics device 106. If so, then remote device establishes or transfers communication session to first wireless network protocol 110 as indicated by the return arrow to step 510. If not, remote device 104 continues communication session through telematics device 106 using second wireless network protocol as described in step 508. In step 518, a manual request can be initiated by a user of remote device 104 or telematics device 106. For example, if a user 109 of remote device 104 is going to move to a distance from telematics device 106 such that second wireless network protocol 112 can no longer be established or maintained between telematics device 106 and remote device 104, then user 109 can request to switch communication session to first wireless network protocol 110. In another example, if telematics device 106 or remote device 104 detect that due to range, signal interference, and the like, that a communication link using second wireless network protocol 112 will no longer function or is about to no longer function, then either device can switch communication session to first wireless network protocol 110. As FIG. 5 demonstrates, while in a communication session with communications node 108, remote device 104 can alternate between using first wireless network protocol 110 and using a second wireless network protocol 112 through telematics device 106.

An example of this embodiment is 3-way calling or call transfer. For example, if remote device 104 is in a communication session via first wireless network protocol 110 to communications node 108, and comes within range of second wireless network protocol 112 of telematics device 106, a 3 way call can be established where telematics device 106 establishes a wireless link with communications node 108 via first wireless network protocol 110 and with remote device 104 via second wireless network protocol 112. Subsequently, the wireless link using first wireless network protocol 110 between remote device 104 and communications node 108 is dropped because the communication session is now via telematics device 106, first wireless network protocol 110 and second wireless network protocol 112. The above situation can work in reverse as well when remote device 104 moves out of range of second wireless network protocol 112 of telematics device 106.

As another example of an embodiment of FIG. 5, a communication session can be any sort of date exchange, such as software, media, voice, content, and the like, from a remote device 104. A communication session can be handed off between communicating with communications node 108 using first wireless network protocol 110 and communicating via telematics device 106 as described above using both first and second wireless network protocols and optionally one or more second wireless network gateways 316. In this embodiment, communication session can alternate between using first wireless network protocol 110 and second wireless network protocol 112 with telematics device 106 as described above. This allows a user 109 to seamlessly move to and from vehicle while maintaining communication with communications node 108 in a cost-effective and efficient manner.

Figure 6:
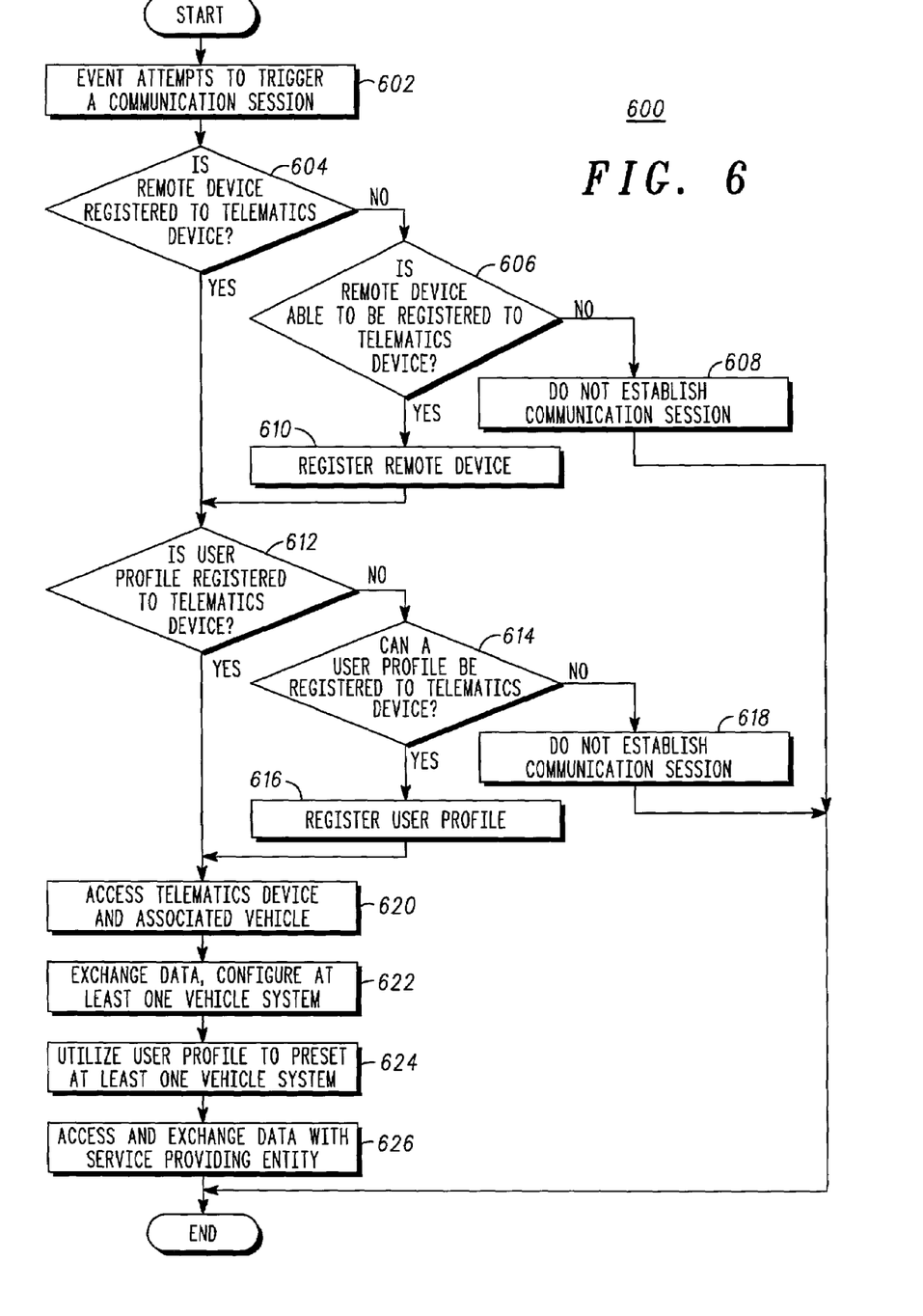
FIG. 6 illustrates a flow diagram of a method of the invention according yet another embodiment of the invention.

FIG. 6 illustrates a flow diagram 600 of a method of the invention according yet another embodiment of the invention. In step 602 event attempts to trigger a communication session. A communication session is a period of communication between two devices. An event can, for example and without limitation, be a manual or automatic action by either remote device 104 or telematics device 106 that requires contacting another electronic device. In the present embodiment, either remote device 104 or telematics device 106 can initiate an event that attempts to trigger a communication session. In one embodiment, remote device 104 can initiate the communications session, and in another embodiment, remote device 104 can act as desired device, in effect, receiving a request for a communications session.

In step 604 it is determined if remote device 104 is registered to telematics device 106. If not, it is determined if remote device 104 can be registered to telematics device 106 per step 606. This might entail telematics device 106 looking up in a memory, database, and the like, to see if remote device 104 is allowed to be registered. If remote device 104 is not allowed to be registered, no communication session is established per step 608. If remote device 104 is allowed to be registered per step 606, remote device can be registered per step 610.

If remote device 104 is registered to telematics device 106 per step 604, it is determined if user profile attempting to access telematics device 106 from remote device 104 is registered to telematics device 106 per step 612. If not, it is determined if a user profile can be created and/or registered to telematics device 106 per step 614. If so, a user profile is registered or created per step 616. This can entail entering data, selecting a password, pin number, and the like. If the user profile is not allowed or one cannot be created, the communication session is not established per step 618.

If remote device 104 is registered and user profile is registered, remote device 104 can exchange data with, access and configure telematics device 106 and associated vehicle 107 per step 620. Also, remote device 104 can exchange data with, access and configure at least one vehicle system 139, 140 through telematics device 106 per step 622. In an embodiment of the invention, user 109 can access vehicle 107 only if the user 109 is registered to telematics device 106 via a user profile, remote device is registered to telematics device 106 and the registered remote device 104 is utilized to access telematics device 106.

In step 624, user profile can be used via remote device 104 to preset at least one vehicle system 139, 140. For example, a user 109 properly registered via a user profile, using a remote device 104 that is registered to telematics device 106, can preset at least one vehicle system 139, 140, for example, start the vehicle's engine, set climate controls, operate an alarm system, check status of any of at least one vehicle system 139, 140, check position 203 and relative position 209 of vehicle, and the like. In step 626, user 109 via remote device 104 that is registered to telematics device 106 can access and exchange data with service providing entity 126 using service requesting entity 134, 156.

In another embodiment, user profile can be input directly into telematics device and control which remote devices 104 can access, exchange data with, control, operate, and the like, telematics device 106, at least one vehicle systems 139, 140, service providing entity 126, and the like. User profile that is registered to telematics device 106 can control which of first wireless network protocol 110 and second wireless network protocol 112 are permitted to access telematics device 106 including at least one vehicle systems 139, 140, service providing entity 126, and the like, as described above. User profile registered with telematics device 106 can also control which remote devices 104 are permitted to access telematics device 106, at least one vehicle system 139, 140, service providing entity 126, and the like, as described above.

Figure 7:
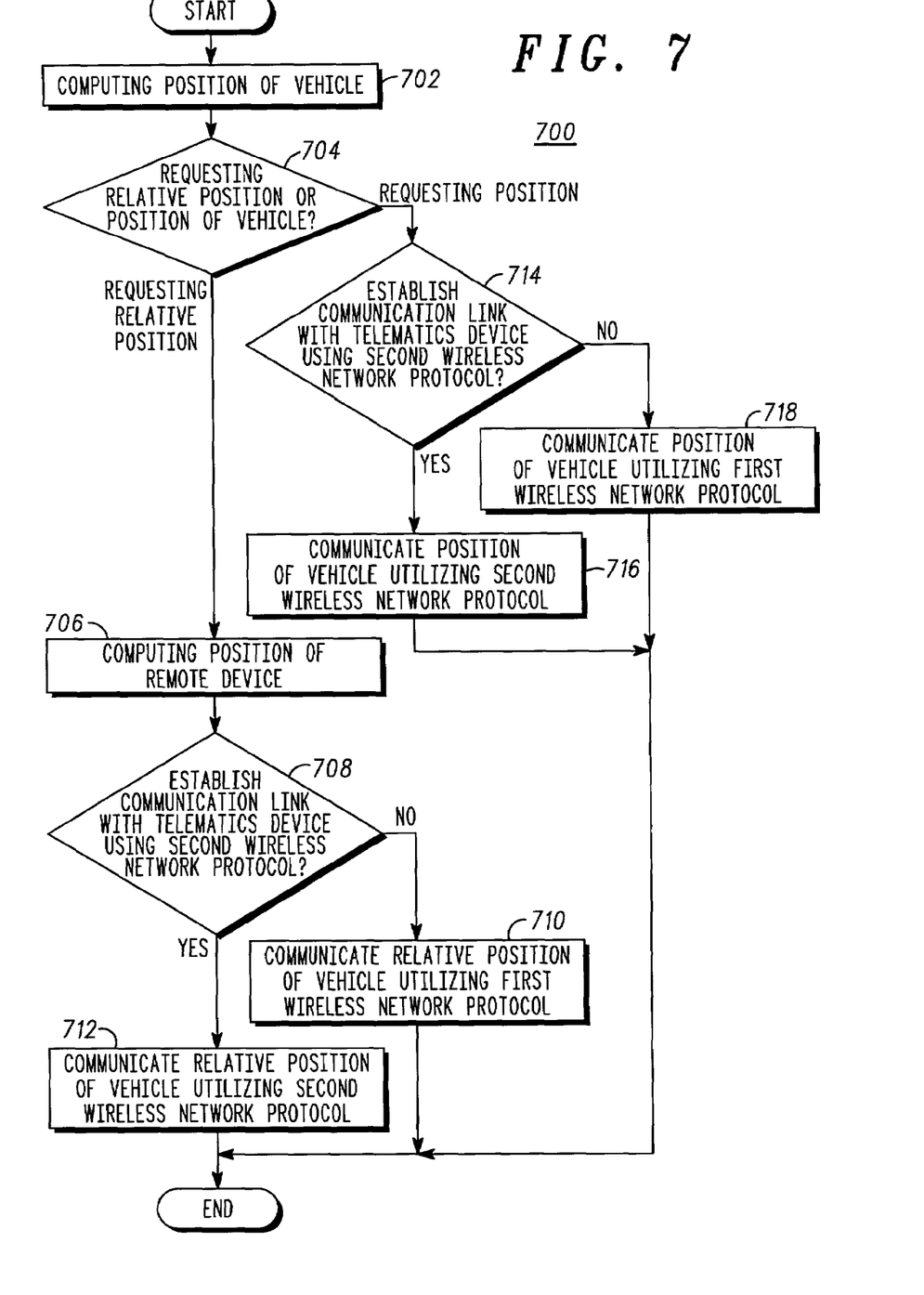
FIG. 7 illustrates a flow diagram of a method of the invention according still yet another embodiment of the invention.

FIG. 7 illustrates a flow diagram 700 of a method of the invention according still yet another embodiment of the invention. In step 702, position of vehicle 203 is computed using TD position system 132 coupled to telematics device 106. In step 704 it is determined if a request is made for the position of vehicle 203 or relative position of vehicle 209. Request can be made by any requesting device, for example, remote device 104. Relative position of vehicle 209 can be the relative position of vehicle 209 to requesting device, for example, remote device 104.

If the position of vehicle 203 is requested per step 704, an attempt is made to establish a wireless communication link with telematics device 106 using second wireless network protocol 112 per step 714, which can include using one or more second wireless network gateways 316. If wireless communication link is successfully established, position of vehicle 203 is communicated to requesting device using second wireless network protocol 112 per step 716. If wireless communication link cannot be established per step 714, position of vehicle 203 is communicated to requesting device using first wireless network protocol 110 via communications node 108 per step 718.

If the relative position of vehicle 209 to requesting device is requested per step 704, position of requesting device, in this embodiment position of remote device 205 is computed per step 706. Subsequently, an attempt is made to establish a wireless communication link with telematics device 106 using second wireless network protocol 112 per step 708. If wireless communication link is successfully established, relative position of vehicle 209 is communicated to requesting device using second wireless network protocol 112 per step 712. If wireless communication link cannot be established per step 708, relative position of vehicle 209 is communicated to requesting device using first wireless network protocol 10 via communications node 108 per step 710.

While we have shown and described specific embodiments of the present invention, further modifications and improvements will occur to those skilled in the art. It is therefore, to be understood that appended claims are intended to cover all such modifications and changes as fall within the true spirit and scope of the invention.

What is claimed is:

1. An integrated personal communications system, comprising:
   a telematics device, wherein the telematics device is coupled to a vehicle, wherein the telematics device can exchange data with at least one vehicle system, and wherein the telematics device comprises a service providing entity;
   a remote device having a service requesting entity, wherein the remote device can access the telematics device utilizing the service requesting entity to exchange data with the telematics device and the at least one vehicle system, wherein the remote device can access the telematics device utilizing the service requesting entity to exchange data with the service providing entity, and wherein a selection is made between a first wireless network protocol and a second wireless network protocol to access the telematics device; and a user profile, wherein a user is registered to the telematics device via the user profile, and wherein the remote device is registered to the telematics device, and wherein only if the user and the remote device are registered to the telematics device can the user access the telematics device and the at least one vehicle system and the service providing entity via the telematics device.

2. The communications system of claim 1, wherein only if the user is registered to the telematics device and utilizes the remote device can the user exchange data with the telematics device and access and operate the vehicle.

3. The communications system of claim 1, wherein the remote device and the user profile is utilized to preset the at least one vehicle system via the telematics device.

4. An integrated personal communications system, comprising:
   a telematics device, wherein the telematics device is coupled to a vehicle, wherein the telematics device can exchange data with at least one vehicle system, and wherein the telematics device comprises a service providing entity;
   a remote device having a service requesting entity, wherein the remote device can access the telematics device utilizing the service requesting entity to exchange data with the telematics device and the at least one vehicle system, wherein the remote device can access the telematics device utilizing the service requesting entity to exchange data with the service providing entity, and wherein a selection is made between a first wireless network protocol and a second wireless network protocol to access the telematics device; and
   a user profile, wherein the user profile is registered to the telematics device, and wherein the user profile controls which of the first wireless network protocol and the second wireless network protocol is permitted to access the telematics device.

5. In a telematics device, a method of integrating a personal communications system, comprising:
   selecting between a first wireless network protocol and a second wireless network protocol to access the telematics device;
   accessing the telematics device via a remote device utilizing a service requesting entity, wherein the telematics device comprises a service providing entity, wherein the telematics device exchanges data with at least one vehicle system, and wherein the telematics device is accessed to exchange data with the at least one vehicle system;
   accessing the telematics device via the remote device utilizing the service requesting entity to exchange data with the service providing entity; and registering a user to the telematics device via a user profile and registering the remote device to the telematics device, and wherein only it the user and the remote device are registered to the telematics device can the user access the telematics device and the at least one vehicle system and the service providing entity via the telematics device.

6. The method of claim 5, further comprising accessing the vehicle only if the user and the remote device are registered to the telematics device and the remote device is utilized for access to the vehicle.

7. The method of claim 5, further comprising utilizing the remote device and the user profile to preset the at least one vehicle system via the telematics device.

8. In a telematics device, a method of integrating a personal communications system, comprising:
   selecting between a first wireless network protocol and a second wireless network protocol to access the telematics device;
   accessing the telematics device via a remote device utilizing a service requesting entity, wherein the telematics device comprises a service providing entity, wherein the telematics device exchanges data with at least one vehicle system, and wherein the telematics device is accessed to exchange data with the at least one vehicle system;
   accessing the telematics device via the remote device utilizing the service requesting entity to exchange data with the service providing entity; and
   registering a user profile to the telematics device, wherein the user profile controls which of the first wireless network protocol and the second wireless network protocol is permitted to access the telematics device.

9. In a remote device, a method of integrating a personal communication system, comprising: selecting between a first wireless network protocol and a second wireless network protocol to access the telematics device;
   accessing a telematics device via the remote device utilizing a service requesting entity, wherein the telematics device comprises a service providing entity, wherein the telematics device exchanges data with at least one vehicle system, and wherein the telematics device is accessed to exchange data with the at least one vehicle system;
   accessing the telematics device via the remote device utilizing the service requesting entity to exchange data with the service providing entity; and
   registering a user to the telematics device via a user profile and registering the remote device to the telematics device, and wherein only if the user and the remote device are registered to the telematics device can the user access the telematics device and the at least one vehicle system and the service providing entity via the telematics device.

10. The method of claim 9, further comprising accessing the vehicle only if the user and the remote device are registered to the telematics device and the remote device is utilized for access to the vehicle.

11. The method of claim 9, further comprising utilizing the remote device and the user profile to preset the at least one vehicle system via the telematics device.

12. In a remote device, a method of integrating a personal communication system, comprising:
   selecting between a first wireless network protocol and a second wireless network protocol to access the telematics device;
   accessing a telematics device via the remote device utilizing a service requesting entity, wherein the telematics device comprises a service providing entity, wherein the telematics device exchanges data with at least one vehicle system, and wherein the telematics device is accessed to exchange data with the at least one vehicle system;

accessing the telematics device via the remote device utilizing the service requesting entity to exchange data with the service providing entity; and registering a user profile to the telematics device, wherein the user profile controls which of the first wireless network protocol and the second wireless network protocol is permitted to access the telematics device.

13. A computer-readable medium containing computer instructions for instructing a processor to perform in a remote device, a method of integrating a personal communications system, the instructions comprising:

selecting between a first wireless network protocol and a second wireless network protocol to access the telematics device;

accessing a telematics device via the remote device utilizing a service requesting entity, wherein the telematics device comprises a service providing entity, wherein the telematics device exchanges data with at least one vehicle system, and wherein the telematics device is accessed to exchange data with the at least one vehicle system;

accessing the telematics device via the remote device utilizing the service requesting entity to exchange data with the service providing entity; and registering a user to the telematics device via a user profile and registering the remote device to the telematics device, and wherein only if the user and the telematics device are registered to the telematics device can the user access the telematics device and the at least one vehicle system and the service providing entity via the telematics device.

14. The method of claim 13, further comprising accessing the vehicle only if the user and the remote device are registered to the telematics device and the remote device is utilized for access to the vehicle.

15. The method of claim 13, further comprising utilizing the remote device and the user profile to preset the at least one vehicle system via the telematics device.

16. A computer-readable medium containing computer instructions for instructing a processor to perform in a remote device, a method of integrating a personal communications system, the instructions comprising:

selecting between a first wireless network protocol and a second wireless network protocol to access the telematics device;

accessing a telematics device via the remote device utilizing a service requesting entity, wherein the telematics device comprises a service providing entity, wherein the telematics device exchanges data with at least one vehicle system, and wherein the telematics device is accessed to exchange data with the at least one vehicle system;

accessing the telematics device via the remote device utilizing the service requesting entity to exchange data with the service providing entity; and registering a user profile to the telematics device, wherein the user profile controls which of the first wireless network protocol and the second wireless network protocol is permitted to access the telematics device.

* * * * *